United States Patent
Schoolman et al.

(10) Patent No.: US 10,154,621 B2
(45) Date of Patent: Dec. 18, 2018

(54) FREE-FLOATING LATERALLY ADUSTABLE GAUGE WHEEL ARM

(71) Applicants: Chad A. Schoolman, Herscher, IL (US); Alan R. Behrends, Clifton, IL (US)

(72) Inventors: Chad A. Schoolman, Herscher, IL (US); Alan R. Behrends, Clifton, IL (US)

(73) Assignee: Shoup Manufacturing Co., Inc., Kankakee, IL (US)

( * ) Notice: Subject to any disclaimer, the term of this patent is extended or adjusted under 35 U.S.C. 154(b) by 0 days.

(21) Appl. No.: 15/406,357

(22) Filed: Jan. 13, 2017

(65) Prior Publication Data
US 2017/0202130 A1    Jul. 20, 2017

Related U.S. Application Data

(60) Provisional application No. 62/408,536, filed on Oct. 14, 2016, provisional application No. 62/279,454, filed on Jan. 15, 2016.

(51) Int. Cl.
*A01C 5/06* (2006.01)
*A01C 7/20* (2006.01)

(52) U.S. Cl.
CPC .............. *A01C 5/064* (2013.01); *A01C 7/203* (2013.01)

(58) Field of Classification Search
CPC ....... A01B 63/166; A01B 63/16; A01B 63/14; A01B 63/00; A01C 5/064; A01C 5/062; A01C 5/06; A01C 5/00; A01C 7/08; A01C 7/00; A01C 7/203; A01C 7/201; A01C 7/20

See application file for complete search history.

(56) References Cited

U.S. PATENT DOCUMENTS

| | | | |
|---|---|---|---|
| 4,009,668 A | 3/1977 | Brass et al. |
| 4,317,489 A | 3/1982 | Steinbach |
| 4,404,918 A | 9/1983 | Whalen et al. |
| 4,463,546 A | 8/1984 | Day |
| 4,570,554 A | 2/1986 | Clark |
| 4,596,200 A | 6/1986 | Gafford et al. |
| 5,235,922 A | 8/1993 | Deckler |

(Continued)

FOREIGN PATENT DOCUMENTS

| WO | WO2013101796 | 7/2013 |
|---|---|---|
| WO | WO2015127054 | 8/2015 |

OTHER PUBLICATIONS

RK Products Inc., Gauge Wheel Arm Pivot Kit retrieved on Oct. 25, 2016 from http://www.rkproducts.com/gwapk.htm, 2 pages.

(Continued)

*Primary Examiner* — Christopher J. Novosad
(74) *Attorney, Agent, or Firm* — Vedder Price PC

(57) ABSTRACT

An assembly for adjustably mounting a gauge wheel arm to the frame of a row unit may include a pivot pin connected on the frame, a bushing freely rotatably mounted on the pivot pin for engagement with the gauge wheel arm such that rotation of the bushing with respect to the gauge wheel arm moves the gauge wheel arm axially, and a locking element that integrates the gauge wheel arm with the bushing so that there is no relative movement therebetween as the gauge wheel arm rotates with respect to the pivot pin.

2 Claims, 6 Drawing Sheets

(56) References Cited

U.S. PATENT DOCUMENTS

| | | |
|---|---|---|
| 5,375,542 A | 12/1994 | Schaffert |
| 5,427,038 A | 6/1995 | Ege |
| 5,538,085 A | 7/1996 | Lowe et al. |
| 5,544,709 A | 8/1996 | Lowe et al. |
| 5,668,451 A | 9/1997 | Noonan et al. |
| 5,676,073 A | 10/1997 | Bergland et al. |
| 5,697,455 A | 12/1997 | Deckler |
| 5,826,337 A | 10/1998 | Klinkner et al. |
| 5,845,471 A | 12/1998 | Seegert et al. |
| 5,896,820 A | 4/1999 | Klinker et al. |
| 5,904,107 A | 5/1999 | Kester |
| 6,041,584 A | 3/2000 | Hohnl |
| 6,237,696 B1 | 5/2001 | Mayerle |
| 6,321,667 B1 | 11/2001 | Shoup |
| 6,918,343 B2 | 7/2005 | Kester |
| 7,631,607 B2 | 12/2009 | Vandersnick |
| 7,669,536 B2 | 3/2010 | Martin |
| 7,975,629 B1 | 7/2011 | Martin |
| 8,267,021 B2 | 9/2012 | Mariman et al. |
| 8,387,715 B2 | 3/2013 | Rylander |
| 8,544,516 B2 | 10/2013 | Mariman et al. |
| 8,616,298 B2 | 12/2013 | Rylander |
| 8,636,077 B2 | 1/2014 | Bassett |
| 8,863,857 B2 | 10/2014 | Bassett |
| 8,910,582 B2 | 12/2014 | Mariman et al. |
| 8,939,095 B2 | 1/2015 | Freed |
| 9,113,587 B2 | 8/2015 | Hesla |
| 9,148,989 B2 | 10/2015 | Van Buskirk et al. |
| 2005/0072344 A1 | 4/2005 | Kester |
| 2013/0160684 A1 | 6/2013 | Whalen et al. |
| 2013/0333599 A1 | 12/2013 | Bassett et al. |
| 2014/0014377 A1* | 1/2014 | Hesla .................... A01C 7/203 172/1 |
| 2014/0352991 A1 | 12/2014 | Patwardhan |
| 2015/0000940 A1 | 1/2015 | Patwardhan et al. |
| 2015/0230392 A1 | 8/2015 | Schafer et al. |
| 2015/0271986 A1 | 10/2015 | Sauder et al. |
| 2015/0359162 A1 | 12/2015 | Needham et al. |
| 2016/0050837 A1 | 2/2016 | Schaffert et al. |

OTHER PUBLICATIONS

Planter Gauge Wheel Arm Kit fits John Deere retrieved on Oct. 25, 2015 from http://www.sloanex.com/kabatgaugewheelarmkitforjdwiththreadedbushing.html, 1 page.

\* cited by examiner

SECTION A-A

SECTION A-A

FREE-FLOATING LATERALLY ADUSTABLE GAUGE WHEEL ARM

CROSS-REFERENCE TO RELATED APPLICATIONS

This application claims the benefit of and priority from U.S. Application Ser. No. 62/279,454, filed Jan. 15, 2016 and U.S. Application Ser. No. 62/408,536, filed Oct. 14, 2016, both of which are hereby fully incorporated herein by reference.

FIELD OF THE DISCLOSURE

This disclosure relates to an agricultural planting machine and more particularly to a planting machine having a pair of rotating disks that open a furrow in which the seeds are deposited as the machine advances and a pair of gauge wheels on opposite sides of the furrow opening disks that control the depth of the furrow opened by the disks. A machine of the above general type is shown in U.S. Pat. Nos. 4,111,137; 5,111,137; 8,387,715; and 8,616,298, all of which are owned by Deere & Co. and the descriptions of such are incorporated herein by reference. More particularly, this disclosure relates to a free-floating laterally adjustable gauge wheel arm mounting assembly and in particular to such assembly including a gauge wheel arm, a bushing that facilitates lateral adjustment of the gauge wheel arm, a locking element that fixes, connects, secures or locks the bushing and the gauge wheel arm together and a pivot pin that is received by the bushing and allows the integrally combined gauge wheel arm and the bushing to pivot smoothly without relative movement therebetween and the pivot pin to bear the load from the gauge wheel arm.

BACKGROUND

In such a machine, it is desirable to have the gauge wheels positioned on the opposite sides of the furrow opening disk in a close relationship to accurately gauge the depth of the furrow and to prevent the build-up of dirt or trash between the gauge wheels and the opening disks. Due to the wear of the machine, it is sometimes necessary to adjust the position of the gauge wheels to maintain the close relationship of the wheels with the opening disks. For that purpose, it is known to provide shims or spacer washers on the opposite side of the arm that rotatably supports the gauge wheels, the upper, inner or proximate end of the arm being mounted on a generally transverse shaft so that the lateral position of the gauge wheel relative to the adjacent disk can be adjusted by removing the bolt that holds the gauge wheel arm until the desired minimum clearance between the gauge wheel and the side of the furrow opening disk is achieved. The above procedure, of course, may be somewhat difficult and time consuming, since to make the adjustment, the gauge wheel arm and the gauge wheel mounted thereon must be removed and replaced to add or subtract the washers or shims, usually multiple times.

Other conventional devices that provide for axial adjustment of the gauge wheel are merely adequate for the intended purpose in design, but in practice are disadvantageous because of a high rate of wear of the central most expensive component, the gauge arm. One prior art device provides axially adjustment of the position of the gauge wheels in connection with the adjacent furrow opening devices and claims to alleviate excessive wear on the bearings by securing the bearing to the frame, which results in undesireable wear of the gauge wheel arm. Another prior art design provides a bushing for mounting the gauge wheel arm that has both a threaded portion as well as one or two smooth cylindrical portions. The threaded portion enables the gauge wheel arm to be a laterally adjusted while the smooth portion or portions purport to provide a bearing surface or surfaces for the gauge wheel arm loads. This is purported to remove the load from the threads, reducing wear of both the bushing and the gauge wheel arm, thereby reducing maintenance cost. However, experience has shown otherwise. Since the gauge wheel arm still moves or pivots about the bushing, there is wear on the engaged threads with every movement of the gauge wheel arm with respect to the bushing.

Therefore, there is a need in the art for simple, inexpensive solution to mount a laterally adjustable gauge wheel arm that does not wear the threads of the gauge wheel arm by rotational friction, that is long lasting and that overcomes the disadvantages of the unreliable or complex prior art systems.

SUMMARY

One advantageous feature is the simple, inexpensive construction. Another advantage is that the adjustment can be easily completed in the field with few tools, so that the operator is not discouraged from adjusting the relationship between the furrow opening disks and gauge wheel to its optimum position.

This disclosure consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of this disclosure, there is illustrated in the accompanying drawings preferred embodiments thereof, from an inspection of which, when considered in connection with the following description, the construction and operation, and many other advantages should be readily understood and appreciated.

DESCRIPTION OF THE PREFERRED EMBODIMENTS

Figure 1:
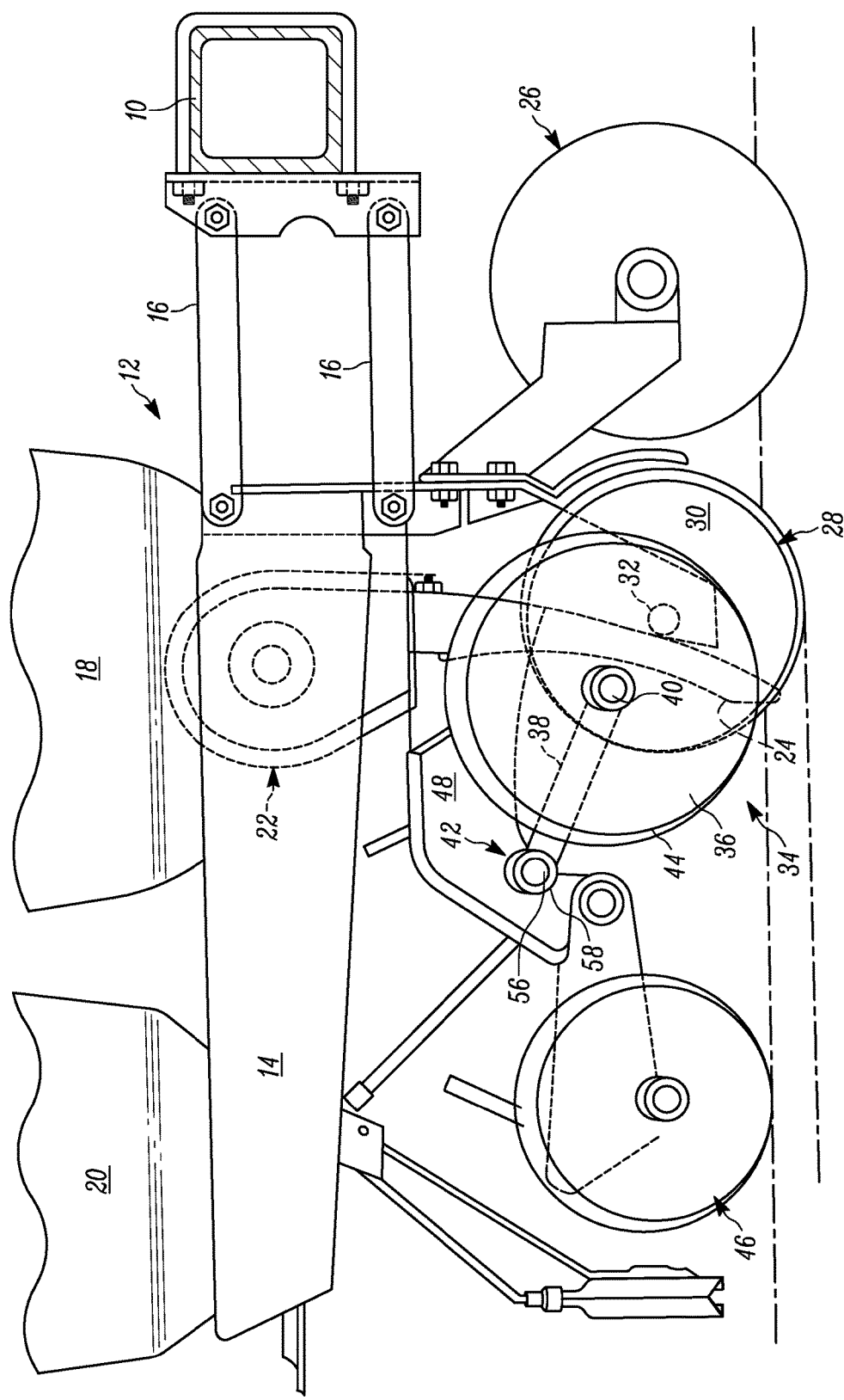
FIG. 1 is a schematic side elevation view of one row unit of a planter embodying the invention.

The following disclosure as a whole may be best understood by reference to the provided detailed description when read in conjunction with the accompanying drawings, drawing description, abstract, background, summary, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

The disclosed new development is embodied in an agricultural planter having a mobile main frame 10, only a portion of which is illustrated in FIG. 1. As is well known, frame 10 is conventionally attached to and towed by a tractor, and a number of individual row units 12, are spaced at intervals along the main frame 10. Each row unit 12 includes a row unit frame 14, the row unit frame of each row unit being independently vertically adjustable relative to the main frame by a pair of fore and aft links 16. Each row unit 12 may include a seed hopper 18 and a insecticide hopper 20, as is well known. Only a single row unit 12 is shown and described herein for the sake of brevity, and, as is conventional, each row unit includes a seed selection mechanism 22 that receives seed from the seed hopper 18 and discharges them downwardly through a seed tube 24 at regular intervals.

A tillage device 26 is mounted on the row unit frame forwardly of a furrow opening device 28. The furrow opening device 28 comprises a pair of generally vertical disks 30 that rotate on generally horizontal transverse shafts 32 that define an axis of each disk 30. The axes 32 of the respective disks 30 are slightly inclined relative to one another so that the disks contact one another forwardly and below the disk axes. In operation, the lower portion of the furrow opening disks 30 are disposed below ground level so that the disks form a V-shaped groove or furrow as the machine advances from right to left as shown on in FIG. 1. All the above is described in greater detail in U.S. Pat. No. 4,009,668, which is incorporated herein by reference. As is apparent, the seed tube 24 deposits the seed in the furrow behind the axis of the furrow opening disks 30.

Figure 2:
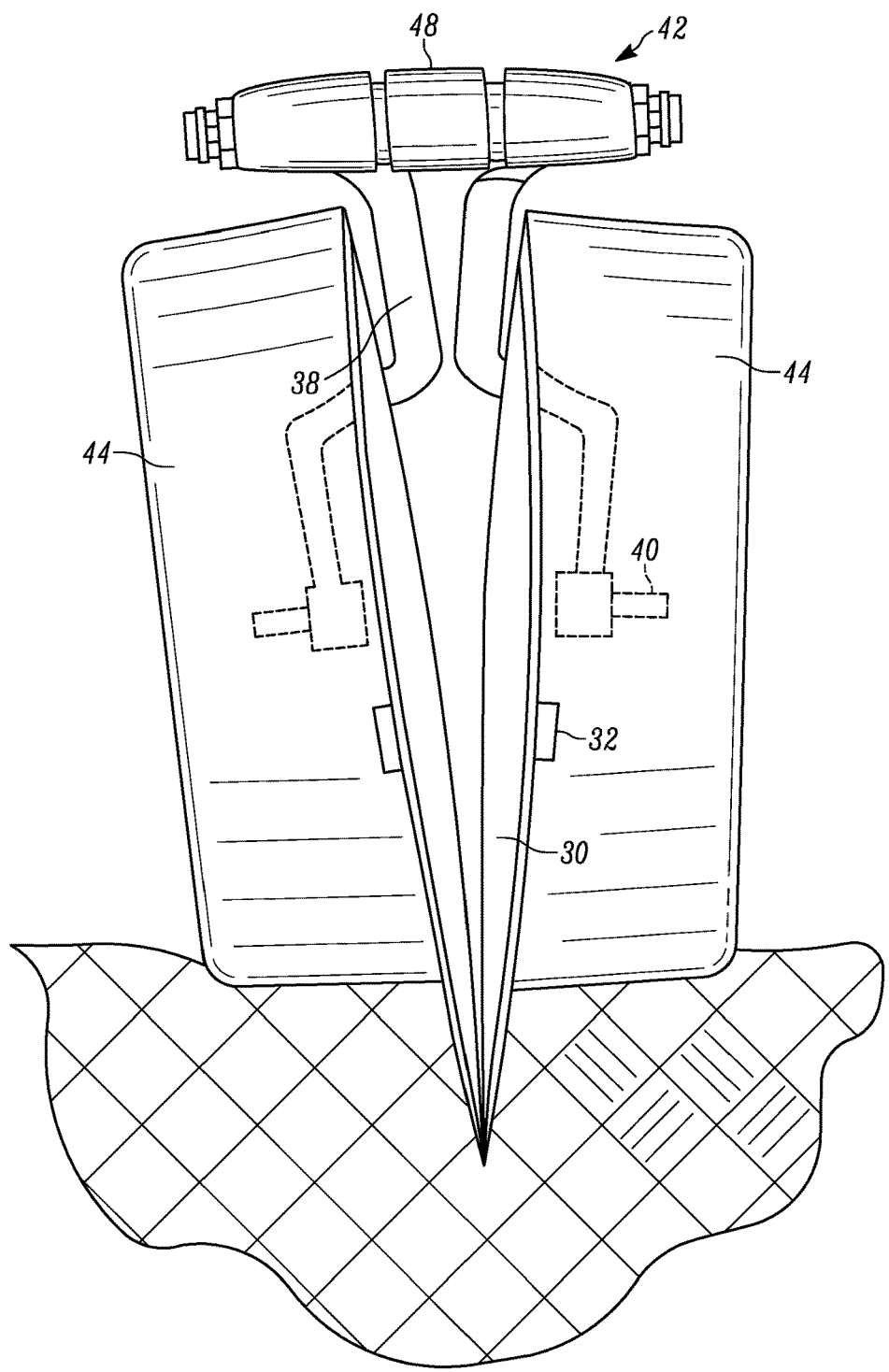
FIG. 2 is a schematic front view of the furrow opening disk and adjacent gauge wheels in an operating position.

A gauge wheel assembly 34 is mounted on the row unit frame 14 adjacent the furrow opening device 28 and includes a pair of gauge wheels 36 respectively disposed adjacent the outer sides of the furrow opening disks 30. The gauge wheels 36 are respectively mounted at the distal or lower ends of upwardly and rearwardly inclined gauge wheel arms 38 via shafts 40 that rotatably support the respective gauge wheels. The proximate or upper ends of the arms 38 are connected to the row unit frame 14 by means of a free-floating laterally adjustable bushing assembly 42. The gauge wheel arms 38 include an internally threaded bore 54 in the upper or proximate end thereof. The gauge wheels 36 are conventionally provided with rubber tires 44 around their periphery, and the tires present a relatively flat ground engaging surface. As is apparent, the axes of the gauge wheels shafts 40 are generally parallel to the axes of the adjacent furrow opening disk shafts 32, the shafts 40 being spaced rearwardly of the shafts 32 (to the left as shown in FIG. 1). As is well known, an adjustable stop (not shown) operates between the row unit frame 14 and the gauge wheel arm 38 to limit the upward movement of the gauge wheel 36 relative to the frame. Since the gauge wheels 36 ride on the surface of the ground when the machine is in operation, the vertical position of the gauge wheels relative to the disks 30 controls the depth of the furrow opening by the disks, as best seen in FIG. 2. The inner edges of the gauge wheel tires 44 slightly engage or are very closely spaced from the outer side of the adjacent furrow opening disks 30, adjacent to the point where the disks leave the ground rearwardly of the disk shafts 32 but forwardly of the gauge wheel shafts 40. The close spacing of the gauge wheel tire 44 to the outer surface of the disk 30 cleans the disk and prevents the buildup of trash and dirt between the gauge wheel 36 and the disk. The close spacing of the gauge wheel 36 to the furrow opening device 28 also accurately gauges the depth of the furrow formed by the furrow opening device. A furrow closure mechanism 46 is also mounted on the row unit frame 14 immediately behind the gauge wheel assembly.

The gauge wheel mounting structure of the present disclosure includes a center frame member 48 having a hole 50, that is preferably threaded on its interior surface, and a face surface 76 formed as a boss about the hole 50, all of which is standard in the art and which is attached to the row unit frame 14. The novel bushing assembly 42 primarily includes a bushing 52, a pivot pin 54, and a connecting, locking, fixing or securing element 77 as shown in FIGS. 3, 3A, 4, 4A, 5, and 5A. The conventional gauge wheel arm 38 has a bushing block 56 at the proximate end of the arm 38 where the arm 38 is mounted to the central frame member 48. The arm 38 and bushing block 56 may be integrally formed as one piece or may be a multiple piece assembly that is connected together in any conventional manner. The bushing 52 preferably includes an exterior threaded portion that complimentarily engages and extends through a bore 58, that has an interior threaded portion, in the block 56 to facilitate lateral adjustment of the pivot arm 36 and gauge wheel 32. In other words, rotation of the bushing with respect to the block results in lateral displacement of the bushing with respect to the block as a result of the complementary threaded engagement.

The pivot pin 54 has a head 55 and a threaded portion opposite the head 55 that complementarily engages and extends into the hole 50 in the central frame member 48. When the pivot pin 54 is tightened, it bears against the frame member 48 (i.e., a shoulder of the pin 54 disposed adjacent the threaded portion bears against the face surface 76) and does not rotate. When the pivot pin 54 is tightened to spec in the hole 50, the bushing 52 can rotate with respect to the pivot pin 54 in order to facilitate lateral and/or pivotal movement of the pivot arm 38 (as described herein), because the pivot pin 54 stands proud of the bushing by approximately preferably 0.005 to 0.015 inches.

The bushing 52 has a generally cylindrical body 60 with a head 62 at a proximal end. The head 62 is hex shaped to enable a tool to be used to rotate the bushing. Shapes other than a hex can be used as desired. A through-bore 64 extends through the bushing 52 so the pivot pin 54 (when extending through the through-bore 64) with the bolt head 55 is disposed adjacent the bushing head 62. A washer 66 may be provided between the bolt head 55 and the bushing head 62. The cylindrical body 60 is formed with a threaded portion 66 that may extend over the entire length of the cylindrical body 60 (other than the bushing head 62) or it may only have selected portions that are threaded. For example, in one embodiment, the cylindrical body 60 may have a smooth center portion 65 and two threaded portions 66 and 66, disposed on opposed sides of the center portion 65. The expression "smooth" merely references a lack of threads rather than a precisely smooth or uncontoured surface. In one embodiment, the center portion 65 may be configured to have a plurality of facets, flats, other contours, or the like, etc. formed or defined thereon to facilitate a locking engagement functionality as discussed herein. The diameter or outermost dimension of the center portion 65 in this embodiment is merely less than the outside diameter of the threads 66. The diameter of the center portion 65 may be smaller than the root diameter of the threads 66. However, in an alternative embodiment, the threaded portion 66 may be continuous and may extend the full length of the cylindrical body 60 from the head 62 to a distal end without a center portion 65 or the threaded portion 66 adjacent the head 62 may extend from the center portion 65 to the head 62, or one threaded portion 66 may have a longer extent than another threaded portion 66.

The bore 58 in the bushing block 56 is complementarily shaped to receive the bushing 42. The bore 58 preferably includes a threaded profile that is complementary to the threaded portion 66. In one embodiment, the bore 58 may have a pair of separate threaded portions 72 disposed on opposed sides of a larger diameter, centrally disposed smooth portion 74. By "smooth" it is meant that the surfaces are free of distinct threads and having an inner diameter that is greater than the threads inner diameter, not precisely smooth as commonly understood by one of skill in the art. When assembled, the threaded portion 66 of the bushing 52 and the threaded portion 72 of the bushing block 56 are complementarily engaged to laterally position the gauge wheel by selective depth of engagement (i.e., since the lateral extent of the bushing block 56 is less that the longitudinal extent of the bushing 52 the bushing block 56 may be disposed at any of an infinitely various different positions along the extent of the bushing 52 by selective complementary thread engagement and adjustment thereof by rotation of the bushing with respect to the block). Preferably, a locking element 77 positively secures the bushing block 56 and the threaded bushing 52 in fixed, registered alignment so that both rotate synchronously, without relative movement therebetween, in order to avoid the disadvantages of the prior art. One of skill in the art will recognize that there are various structural configurations that will facilitate this intended functionality, including numerous threaded fasteners.

Figure 3:
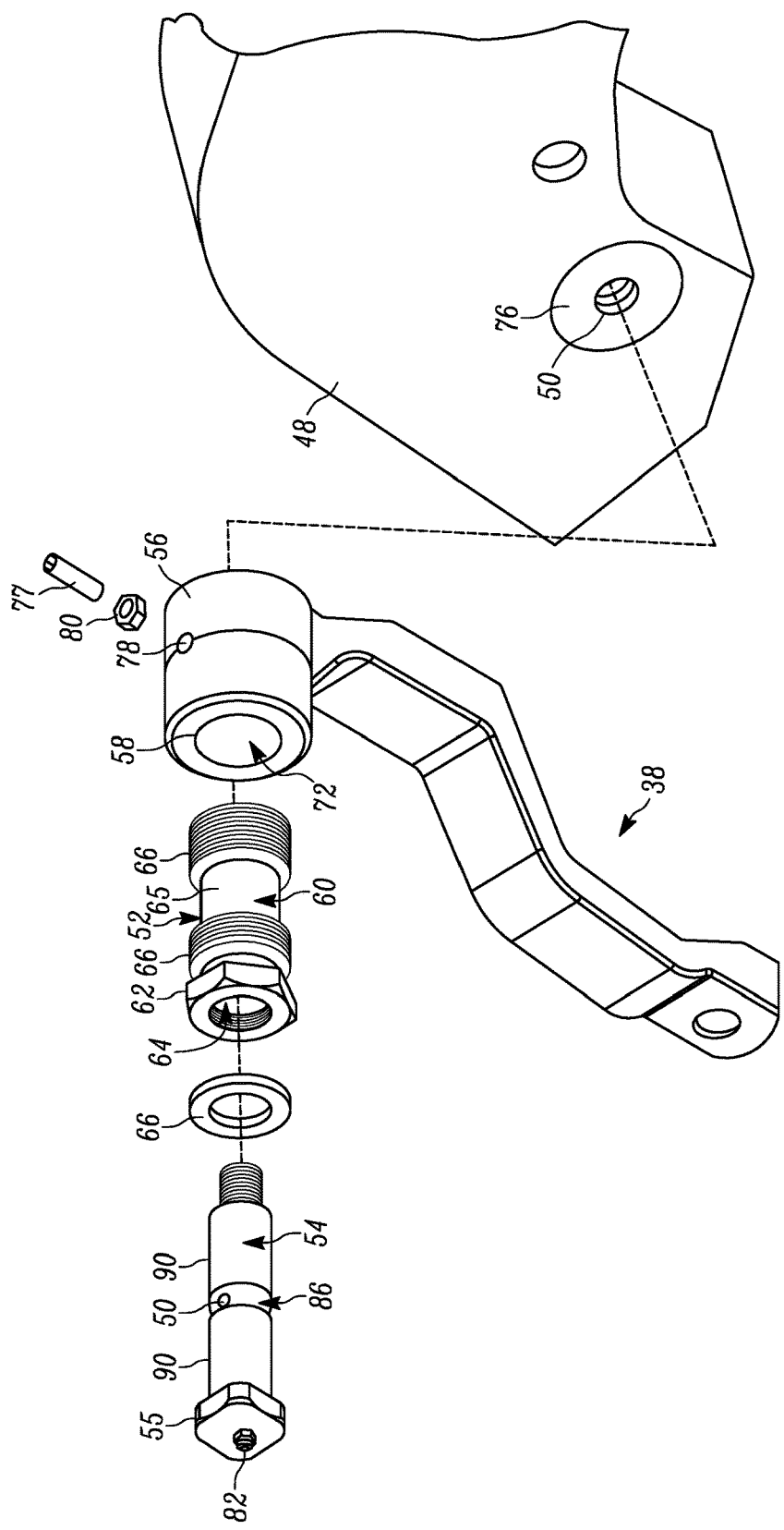
FIG. 3 is an exploded view of one embodiment of a free-floating laterally adjustable gauge wheel arm for one of the gauge wheels.
Figure 4:
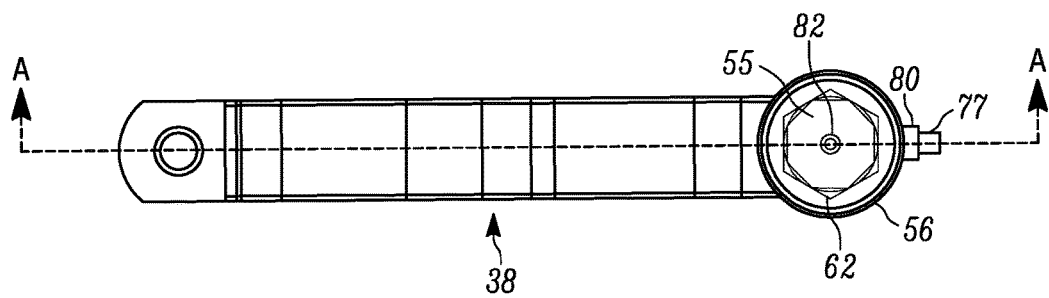
FIG. 4 is top plan view of the adjustable gauge wheel arm of FIG. 3.
Figure 4A:
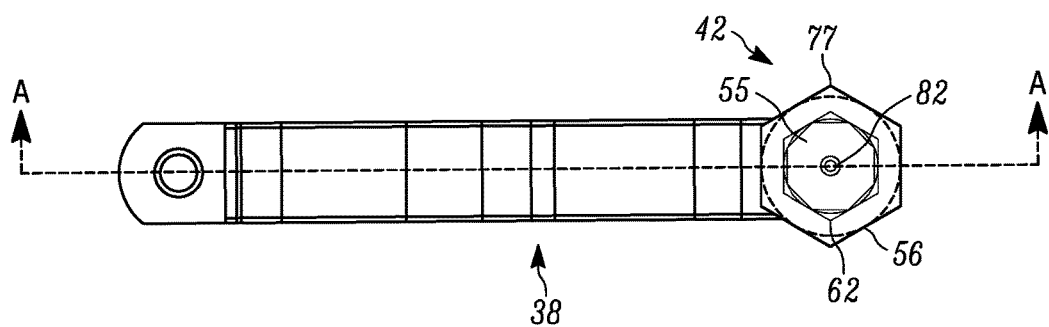
FIG. 4A is a top plan view of the adjustable gauge wheel arm of FIG. 3A.
Figure 5:
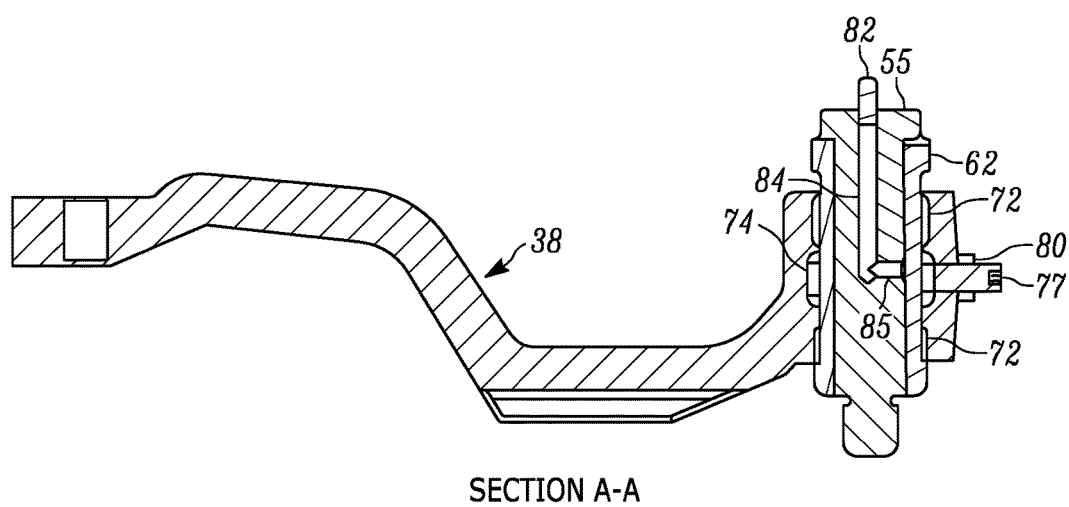
FIG. 5 is a cross-section view of the adjustable gauge wheel arm of FIG. 4.
Figure 5A:
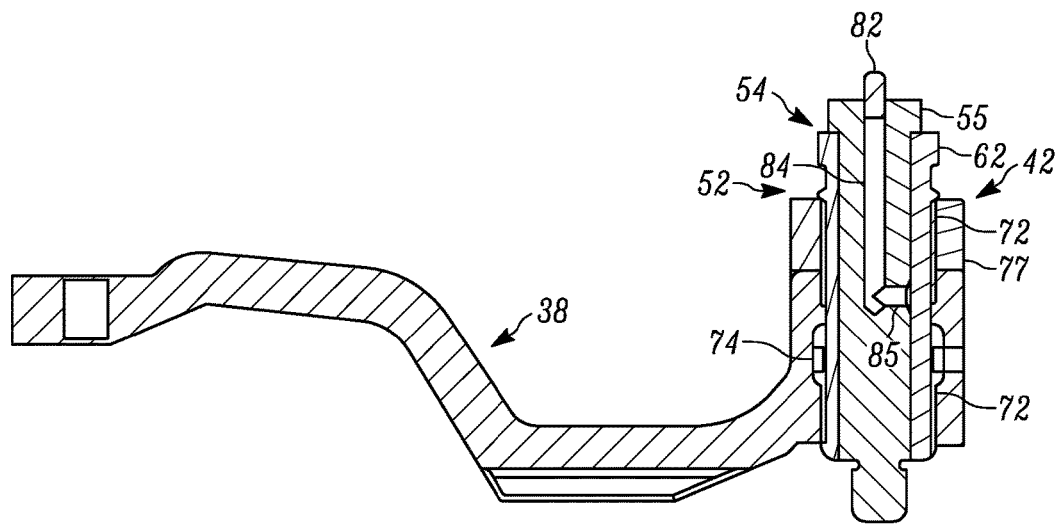
FIG. 5A is a cross-section view of the adjustable gauge wheel arm of FIG. 4A.

In one embodiment, as shown in FIGS. 3, 4 and 5, a locking element in the form of a set screw 77 threadingly engages an aperture 78 formed in the bushing block 56 that is aligned in registration with the centrally disposed smooth portion 65. The set screw 77 is threaded into the aperture 78 into contact with the central portion 65 of the bushing 52 and torqued to a predetermined level in order to fix the bushing 52 and the bushing block 56 together substantially as an integral unit so that there is no relative movement therebetween. A jam nut 80 may be threaded onto the set screw 77 and into contact with the bushing block 56 so as to prevent unwanted movement or loosening of the set screw 77. Preferably, the central portion 65 has a configuration that facilitates locking and securing engagement such as facets, flats or the like, etc. formed or defined thereon so that the set screw 77 positively secures the bushing block 56 and the threaded bushing 52 in fixed, registered alignment so that both rotate synchronously without relative movement therebetween.

Figure 3A:
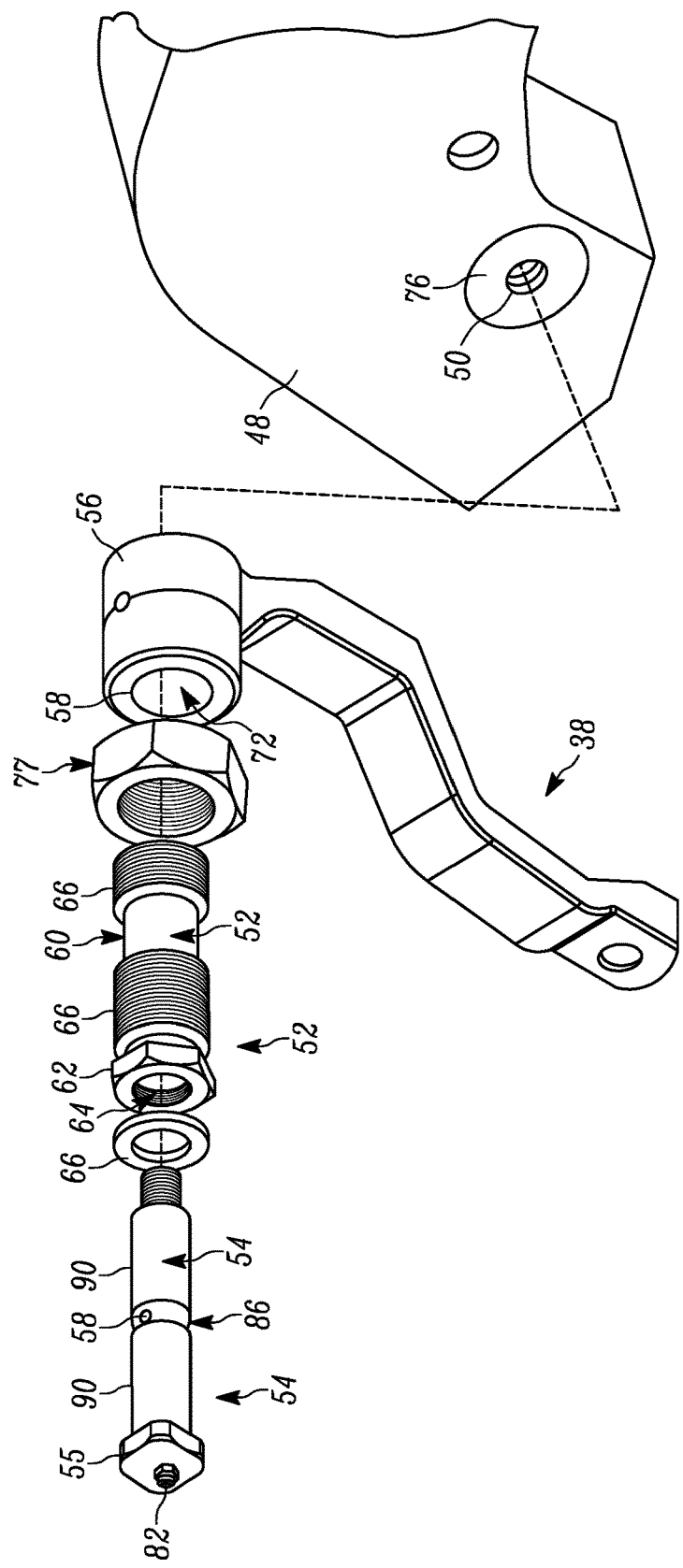
FIG. 3A is an exploded view of an alternative embodiment of a free-floating laterally adjustable gauge wheel arm for one of the gauge wheels.

In another embodiment, as shown in FIGS. 3A. 4A and 5A, a jam nut 77 threadingly engages the threaded portion 66, between the center portion 65, if present, and the head 62, so that the jam nut 77 may be brought to bear against the bushing block 56 thereby locking the jam nut 77 and bushing block 56 in fixed, registered alignment so that both rotate synchronously without relative movement therebetween.

The bushing assembly 42 is lubricated by a grease fitting 82 threaded into an aperture formed in the bolt head 55. The pivot pin 54 includes a bore 84 that extends from the bolt head aperture to a cross-bore 85 that extends laterally to a circumferential recessed portion 86 formed in the pivot pin 54 defining aperture 88. Thereby grease is provided to bore 64 of the bushing 52 and the smooth portions 90 that flank the recessed portion 86, so that the integrated bushing 52 and arm 38 may rotate or pivot about the pivot pin 55 smoothly and that the lubricated smooth portions 90 and the bore 64 cooperatively defined bearing surfaces to support the loads on the gauge wheel.

Lateral adjustment of the gauge wheel position is performed by loosening the locking element 77, regardless if the set screw or the jam nut, and rotating the bushing 52, causing the bushing block 56 to move axially along the threads 66 of the bushing 52 in the desired direction, then tightening the locking element 77 as described above so that the bushing block 56 and the threaded bushing 52 are in fixed, registered alignment so that both rotate synchronously without relative movement therebetween. This process may be accomplished without loosening the pivot pin 54. This prevents disadvantageous rotation of the bushing 52 with respect to the arm 38, all the while keeping the gauge wheel arm in a desired position axially along the length of the bushing. The gauge wheel arm 38 remains free to rotate about the pivot pin 54 as the gauge wheel moves up and down during normal operation.

Because of the forces generated during use, there has been a tendency for certain of the parts in the gauge wheel arm adjusting mechanism to fail. Using a combination of the bushing 52, internally threads 72 of the gauge wheel arm 38 and locking element 77, such as the set screw or jam nut, as a single integral unit, alleviates and overcomes all of the problems encountered in the use of the gauge wheel adjusting mechanisms previously supplied in the art.

In order to supply the aftermarket in the agricultural field, it is desirable to sell a kit comprised of gauge wheel arm 38, a bushing 52, a washer 66, a threaded pivot pin 54, and a locking element 77, such as a set screw or jam nut, thereby enabling the farmer to change gauge wheel arms and adjusting mechanisms as needed, without any other changes required to the planting machine, row unit, frame, etc.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein

The invention claimed is:

1. In an agricultural row unit having a frame and a pair of gauge wheel assemblies connected to the frame, each gauge wheel assembly including a gauge wheel rotatably connected to a distal end of a gauge wheel arm for rotation about an axis, an assembly for adjustably mounting a proximate end of each gauge wheel arm, which has an internally threaded bore, to the frame comprising: a pivot pin connected to the frame; a bushing rotatably disposed on the pivot pin and having an externally threaded portion that engages the threaded bore in the gauge wheel arm such that rotation of the bushing with respect to the gauge wheel arm facilitates movement of the gauge wheel arm along a longitudinal axis of the bushing; and a locking element engaging the gauge wheel arm and the bushing so that there is no relative movement therebetween as the gauge wheel arm rotates with respect to the pivot pin.

2. The adjustable mounting assembly of claim 1, where the locking element is a threaded fastener.

* * * * *